(12) United States Patent
Bunge

(10) Patent No.: US 10,378,517 B2
(45) Date of Patent: Aug. 13, 2019

(54) METHOD FOR REPLACING THE BLADES OF A WIND TURBINE TO MAINTAIN SAFE OPERATION

(71) Applicant: Steffen Bunge, Pinawa (CA)

(72) Inventor: Steffen Bunge, Pinawa (CA)

(*) Notice: Subject to any disclaimer, the term of this patent is extended or adjusted under 35 U.S.C. 154(b) by 0 days.

(21) Appl. No.: 15/604,041

(22) Filed: May 24, 2017

(65) Prior Publication Data

US 2018/0003159 A1 Jan. 4, 2018

Related U.S. Application Data

(63) Continuation-in-part of application No. 14/637,566, filed on Mar. 4, 2015, now abandoned.

(60) Provisional application No. 61/947,828, filed on Mar. 4, 2014.

(51) Int. Cl.
| | | |
|---|---|---|
| *G06K 9/00* | (2006.01) | |
| *F03D 17/00* | (2016.01) | |
| *F03D 80/50* | (2016.01) | |
| *G01B 11/16* | (2006.01) | |
| *G06T 7/00* | (2017.01) | |

(52) U.S. Cl.
CPC ............ *F03D 17/00* (2016.05); *F03D 80/50* (2016.05); *G01B 11/16* (2013.01); *G06T 7/0004* (2013.01); *F05B 2260/80* (2013.01); *F05B 2270/17* (2013.01); *F05B 2270/33* (2013.01); *F05B 2270/8041* (2013.01); *G06T 2207/10016* (2013.01); *Y02E 10/72* (2013.01)

(58) Field of Classification Search
None
See application file for complete search history.

(56) References Cited

U.S. PATENT DOCUMENTS

| | | | | | |
|---|---|---|---|---|---|
| 4,053,227 | A | * | 10/1977 | Bodlaj | G01B 11/0608 356/3.02 |
| 4,887,468 | A | * | 12/1989 | McKendree | G01H 1/006 73/660 |
| 9,803,492 | B2 | * | 10/2017 | Ruhge | F01D 5/22 |
| 2004/0057828 | A1 | * | 3/2004 | Bosche | F03D 7/0204 416/1 |

(Continued)

OTHER PUBLICATIONS

Kim, H. C., Giri, P., & Lee, J. R. (2012). A real-time deflection monitoring system for wind turbine blades using a built-in laser displacement sensor. In Proceedings of the 6th European Workshop on Structural Health Monitoring,(EWSHM 2012) Jul. 3-6, 2012, Dresden, Germany (pp. 1010-1018).*

*Primary Examiner* — Samah A Beg
(74) *Attorney, Agent, or Firm* — Adrian D. Battison; Ade & Company Inc.; Kyle R. Satterthwaite

(57) ABSTRACT

In a wind turbine of the type including a tower and a nacelle with the rotor being rotatably connected to the nacelle for rotating about a rotor axis and having a plurality of equally spaced blades, there is provided a method of detecting damage to a rotor requiring replacement. The method includes positioning video cameras on each of the blades at a root of a respective one of the blades so as to provide a line of sight of the camera along the respective one of the blades to the tip to obtain a video image of the rotor and tip as they rotate. From the videos an analysis is carried out of the images of the tip at a common location spaced away from the tower to determine a position of the tip and hence the deflection of the tip which is indicative of damage.

9 Claims, 12 Drawing Sheets

(56) References Cited

U.S. PATENT DOCUMENTS

| | | | | |
|---|---|---|---|---|
| 2008/0101930 A1* | 5/2008 | Bosche | F03D 7/0204 | 416/31 |
| 2010/0135796 A1* | 6/2010 | Kavala | F03D 1/0675 | 416/1 |
| 2011/0103933 A1* | 5/2011 | Olesen | G01B 11/16 | 415/118 |
| 2011/0135466 A1* | 6/2011 | Latorre | F03D 7/02 | 416/1 |
| 2011/0140431 A1* | 6/2011 | Landa | F03D 7/0224 | 290/44 |
| 2011/0150647 A1* | 6/2011 | Gierlich | F03D 17/00 | 416/1 |
| 2012/0029840 A1* | 2/2012 | George | F03D 17/00 | 702/34 |
| 2012/0045330 A1* | 2/2012 | Wu | F03D 7/042 | 416/1 |
| 2012/0132011 A1* | 5/2012 | Frere | F03D 1/0675 | 73/861.85 |
| 2012/0200699 A1* | 8/2012 | Bunge | F03D 1/0675 | 348/142 |
| 2013/0093879 A1* | 4/2013 | Bertolotti | F03D 1/06 | 348/125 |
| 2013/0194567 A1* | 8/2013 | Wan | G01B 11/14 | 356/152.1 |
| 2013/0287567 A1* | 10/2013 | Olesen | F03D 7/0288 | 416/1 |
| 2014/0054476 A1* | 2/2014 | Zheng | F03D 17/00 | 250/578.1 |
| 2014/0241878 A1* | 8/2014 | Herrig | F03D 7/0224 | 416/1 |
| 2014/0271181 A1* | 9/2014 | Perley | F03D 7/042 | 416/1 |
| 2015/0110596 A1* | 4/2015 | Huang | F03D 17/00 | 415/1 |
| 2015/0199805 A1* | 7/2015 | Hatcher, Jr. | G06T 7/004 | 348/135 |
| 2015/0240787 A1* | 8/2015 | Byskov | F03D 17/00 | 416/1 |
| 2015/0322925 A1* | 11/2015 | Klitgaard | F03D 17/00 | 416/1 |
| 2017/0241957 A1* | 8/2017 | Sohn | G01N 29/2418 | |
| 2018/0003161 A1* | 1/2018 | Michini | F03D 17/00 | |
| 2019/0072082 A1* | 3/2019 | Lysgaard | F03D 7/0204 | |

* cited by examiner

METHOD FOR REPLACING THE BLADES OF A WIND TURBINE TO MAINTAIN SAFE OPERATION

This application is a continuation in part of application Ser. No. 14/637,566 filed Mar. 4, 2015 and now abandoned.

This application claims the benefit under 35 USC 119 (e) of Provisional Application 61/947,828 filed Mar. 4, 2014.

This invention relates to a method for replacing blades of a wind turbine to maintain safe operation by detecting deflection of the blades a rotor of a wind turbine of the type comprising a tower and a nacelle mounted to the top of the tower, the rotor being rotatably connected to the nacelle for rotating about a rotor axis and having a plurality of equally spaced blades around the axis.

BACKGROUND OF THE INVENTION

Wind turbines in HAWT design (horizontal axis) consist of four main parts as a structure, the base, the tower, the nacelle and the rotor with one or more blades.

The blades are mounted at fixed angularly spaced positions around the axis. The turbine includes a wind detection system which analyses the wind speed and direction repeatedly so as to repeatedly adjust the angle of the nacelle around a vertical axis of the tower, that is the angle of the rotor axis relative to the wind direction, and to adjust the angle of attack of the blades around the longitudinal axis of the blade relative to the wind speed.

A common target for structural measurements on wind turbine is to determine the deflection of rotor blades. This is either because the manufacturer wants to verify the original design or design improvements.

The setup of such a measurement is rather complicated and expensive (up to multiple $100,000) and time consuming. Typically this requires the application of strain gauges at predetermined positions along the length of the blade so that the deflection at leach location can be detected and analyzed.

Furthermore because of the expense of this method, testing is usually limited to one turbine without knowing if it is representative of multiple turbines. The conventional method is not suitable in a situation where the structural integrity of a blade is in question for example after lightning strikes.

During the operation of a wind turbine technical events such as structural failure (wear and tear), over loading, lightning strikes or flying debris in storm scenarios can create unsafe conditions. Most of those events can cause critical damage to the other third of the blade.

In those cases it is often imperative to verify the integrity of the structural strength of the blades structure to either insure the continued safe operation or to stop the operation of the turbine to prevent catastrophic failure scenarios such as blade parts falling off or a blade striking to the tower. The easiest way to verify structural integrity is to analyse and observe the visual blade deflection of all three blades which should be uniform under all load conditions.

Previous systems used and implemented for blade load measurements are for instance Bragg Fibres laminated into the blade structure during production. This allows observing and documenting blade load and deflection on several pre-determined points along the blade axis. The use of Bragg fibres requires the installation during the initial production of the blade and cannot be applied at any later date. Bragg fibres also have shown a high percentage of degradation or failure after a just a few years in operation.

Other systems use Strain gauges which are typically applied inside the blade along the accessible inner $3^{rd}$ of the blade length. Since it only can document load for the first $3^{rd}$ of the blade length it is mostly unsuitable for detecting structural damage in the outer $3^{rd}$ of the blade. While the process is very capable on observing blade moments at the blades root it is a very expensive application. Installation, instrumentation and post processing typical can account for expenses in excess of the cost of one or more blades. It is therefore not practical to proof or disproof structural anomalies with the objection to replace one blade, since the total costs would be in the range of a full rotor set of blades.

There have been also application attempts using laser deflectors inside blades. Those systems are either pre-installed during blade production or at a later point only accessing the inner $3^{rd}$ of the blade due to inaccessibility of the blade. This system also has a number of technical restrictions. The blades inside typically has a number of structural support structures, like one or more shear webs or even chamber like structures which would block the line of sight. If one would assume a pre-installed system with a free line of sight blade core area, the system would have to overcome the look over or around an inner blade horizon. This horizon is created when the blade is bending under load in which case the blade axis near the tip and near the root can create angles in excess of 30 degree.

Another system uses one camera looking for a just one very short moment at a blade deflection relative to the tower. The system does not allow real time side by side blade deflection comparison and is using the least suitable blade position for a blade moving around the rotor disc and therefore it is not providing significant value.

SUMMARY OF THE INVENTION

It is one object of the present invention to provide a method of detecting an amount of deflection of the blades of a rotor of a wind turbine which can be effectively and quickly used to detect deflection of the blade of a wind turbine for use in assessing structural integrity of the wind turbine. Using this method it may be possible to readily detect structural damage of the type causing unacceptable deflection before the damage to the blade can lead to catastrophic damage to the whole turbine.

According to the invention there is provided a method of detecting an amount of deflection of the blades of a rotor of a wind turbine, the wind turbine comprising a tower and a nacelle mounted to the top of the tower, the rotor being rotatably connected to the nacelle for rotating about a rotor axis and having a plurality of equally spaced blades, the method comprising:

positioning a video camera on the rotor at a root of a respective one of the blades so as to provide a line of sight of the camera along the respective one of the blades to the tip to obtain video images of the rotor and tip;

and carrying out an analysis of the images to determine a position of the tip and hence the deflection of the tip.

Preferably the method is for use in assessing structural integrity of the wind turbine. Using this method it may be possible to readily detect structural damage of the type causing unacceptable deflection before the damage to the blade can lead to catastrophic damage to the whole turbine.

Preferably the analysis is carried out by obtaining on the camera during rotation of the rotor a plurality of frames of the video image, selecting for analysis from the plurality of frames of the video image at least one frame for analysis and carrying out an analysis of the frame to determine a position of the tip of the blade in the frame. However the video image can be analyzed directly.

Preferably the frame selected is located at a predetermined angular position of the blade of the rotor. This can be done by including a known landmark component which is visible in the image or frame and typically this can be the horizon.

Preferably the predetermined angular position of the blade of the rotor is located at the horizon on the side angularly beyond the tower.

Preferably there is provided a camera on each blade and the method includes selecting and comparing the position of the tips in the frames. In this case the frames selected for the blades are preferably located at the same predetermined angular position of the blade of the rotor.

Preferably the video image is taken during a period of time which is sufficient in length to contain different loading conditions on the blades due to changes in wind conditions.

Preferably at least two frames are selected at different loading conditions for comparison of deflection at different loads and the method includes selecting and comparing the position of the tips in the frames at the same loading conditions and at the same angular orientation.

Preferably the image or frame is analyzed by detecting and defining in the frame the peripheral edge of blade.

Preferably the geometric dimensions of the blade at a known location on the blade are used in the image for calculating from those known dimensions a value for the deflection in actual length and verified against design values.

Preferably known width dimension at a predetermined visible position along the blade is used to calculate deflection.

Preferably the images are analyzed at different load, capacity, power produced or environmental data such as wind speed and similar.

The method as disclosed in detail herein may provide one or more of the following advantages and features:

The introduction of quick load assessments with hub/blade mounted cameras allows the system herein to verify and compare the mechanical deflection under a variety of load scenarios.

Mounting of multiple cameras can be done easily and quickly. There is virtually no time connected with production loss during installation or testing itself.

The cameras can be mounted usually while the designated wind speed is available.

To assess multiple turbines, the cameras can quickly be changed over to the next turbine. Alternatively in view of the relatively low cost of the equipment, a number of turbines can be assessed simultaneously. The conventional setup using strain gauges is usually installed during no/low wind situations and then stays at the turbine for several months.

At the end of a session using the present method, a huge number of blades can be compared to each other, rather than only three blades by a measurement done in the conventional way. If the results do show blades performing better or worse than the majority, then conventional testing can be performed on those turbines of particular interest.

The cameras can record up to 8 hours of video and depending on camera equipment and requirements, cameras can be equipped with external power supply and live off-camera storage to extend test periods to provide a number of different loading conditions within the recording session.

Most effective are positions at the horizon on the downwind side of the blade or hub bearing since it is expected that the blade will deflect in this direction. The camera is typically arranged looking along the blade, although other positions maybe required for different blade styles and blades with significant pre-bend up wind.

Typically four cameras can be used where three are mounted one on each blade and one is provided as a backup only. However a number of cameras can be arranged at positions all around the blade.

The cameras are preferably mounted with neodymium magnets on the outside of the main bearing, that is the blade bearing at the root of the blade. Where the steel hub or bearing is not accessible, the cameras can be mounted on a strap fixed around the blades root.

The cameras are preferably mounted on the high pressure side or downwind side of the blade looking along the blade at the leading edge. However the cameras can be mounted on the nacelle side looking at the "flat" low pressure side and at the trailing edge.

This procedure allows optically monitoring and documenting the deflection of the blades under load and comparison between the individual blades.

The camera can be aimed at a flat side of the blade to determine deflection but it may also be aimed at the contour lines at the trailing edge and leading edge.

The cameras are preferably located at the root of the blade depending on what area is accessible. This can be at the root of the blade for blades with a fiber glass body, with some sort of mounting apparatus, but it can be also mounted at any suitable surface like the blade bearing or hub body. The camera is to be mounted at the root circumference of the blade or at a similar position with the direction of view perpendicular to the blades longitudinal axis. The view can be along any side of the blade.

The camera is preferably lined up along the blade's longitudinal axes. Those are primarily the low and high pressure sides as well as the leading edge and trailing edge sides or anything in between and whatever can give the best results.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
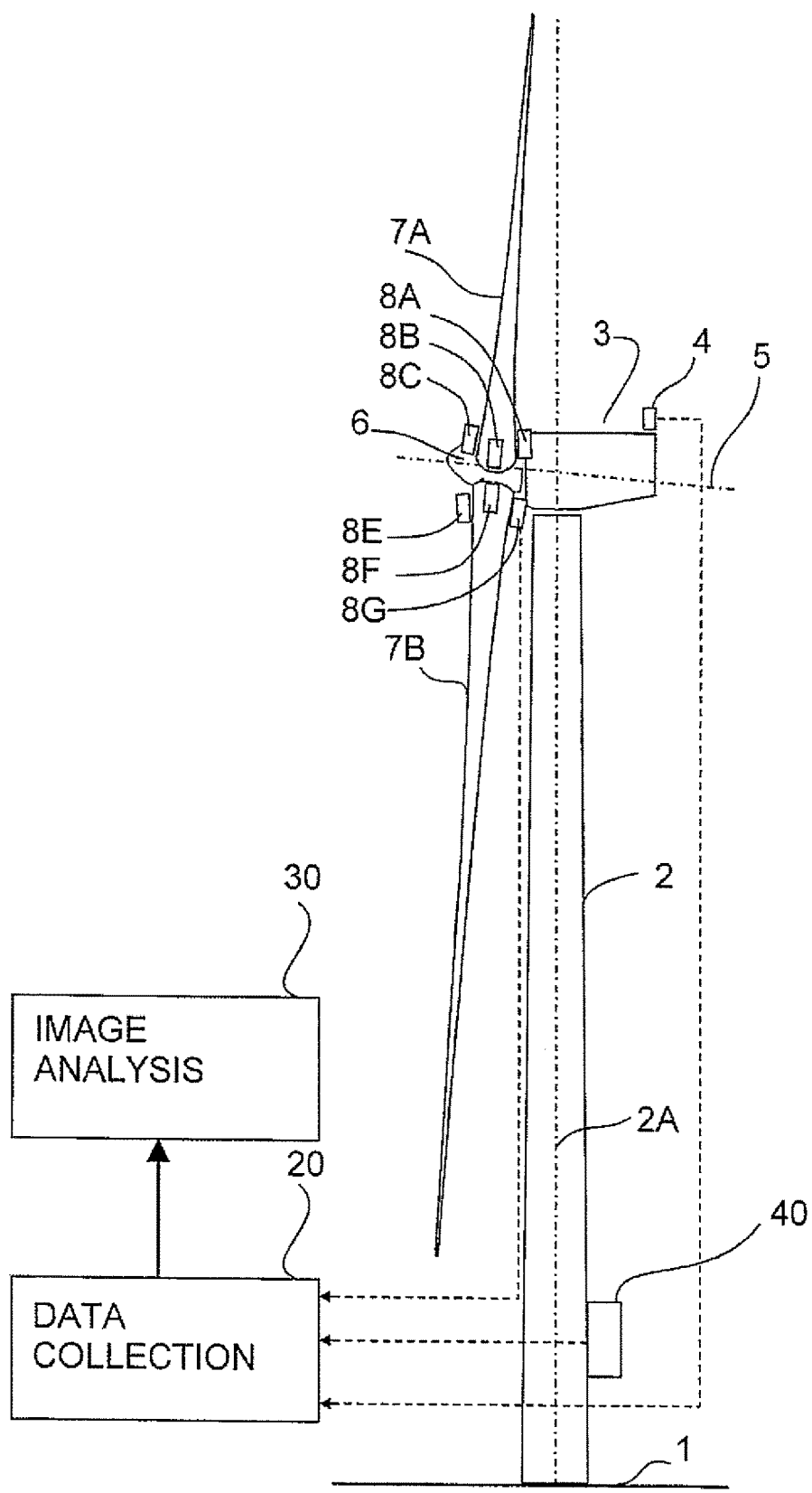
FIG. 1 is a side elevational view of a conventional turbine showing the location of the cameras of the present invention.

In FIG. 1 is shown a conventional wind turbine. This includes a nacelle 3 mounted on a tower 2 carried on a base 1. A main shaft (not shown) connects the drive train to the hub and rotor assembly of the hub body 6 carrying the blades 7. There are typically three blades 7A, 7B and 7C arranged at 120 degrees. The blades 7 are mounted at fixed angularly spaced positions around the rotor axis 5.

The turbine includes a wind detection and control system 4 in the form of an anemometer which analyses the wind speed and direction repeatedly so as to repeatedly adjust the angle of the nacelle 3 around a vertical axis 2A of the tower, that is the angle of the rotor axis relative to the wind direction, and to adjust the angle of attack of the blades 7 around the longitudinal axis of the blade relative to the wind speed.

The possible positions of the mounting of the video camera 8 on the blades 7A and 7B in relation to the hub 6 are shown in FIG. 1 as follows:

8A is located at the down-wind position of the first blade 7A;

Camera 8B is located at the leading edge position of the first blade 7A;

Camera 8C is located at the up-wind position of the first blade 7A;

Camera 8E is located at the up-wind position of the second blade 7B;

Camera 8F is located at the trailing edge position of the second blade 7B;

Camera is located at the down-wind position of the second blade 7B.

Also shown in FIG. 1 schematically are the components for carrying out the analysis including a data collection system 20 which collects data from the cameras 8, the wind detection and control system 4 and from the power output control 40. The turbines controller and SCADA (Data acquisition) system can be located off-site or on-site. This data can be synchronized in time by the data collection system to indicate in the images when certain conditions or load scenarios are encountered. The images and data associated therewith are then transmitted or supplied to an image analysis system 30 using the techniques described hereinafter.

Figure 2:
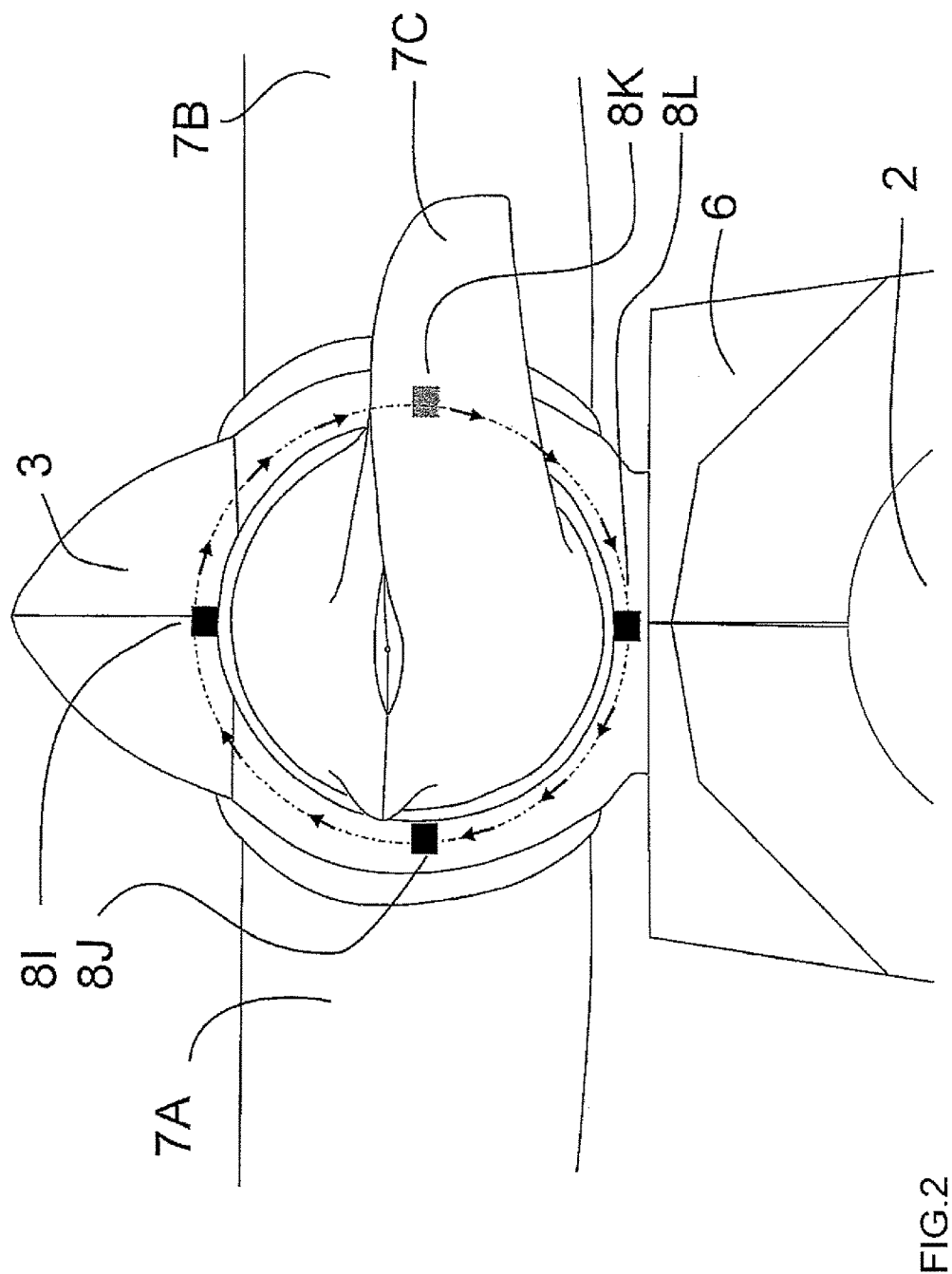
FIG. 2 is view of the components of FIG. 1 looking along one blade showing optional placements of the cameras of the method of the present invention.

FIG. 2 is view of the components of FIG. 1 looking along one blade 7C and showing the other blades 7A and 7B in the common plane of the view carried on the hub body 6 mounted on the tower 2.

The possible positions of the mounting of the video camera 8 on the third blade 7C in relation to the nacelle 3 are shown in FIG. 2 as follows:

Camera 8I is located at the up-wind position;
Camera 8J is located at the leading edge position;
Camera 8K is located at the trailing edge position;
Camera 8L is located at the down-wind position.

Figure 3:
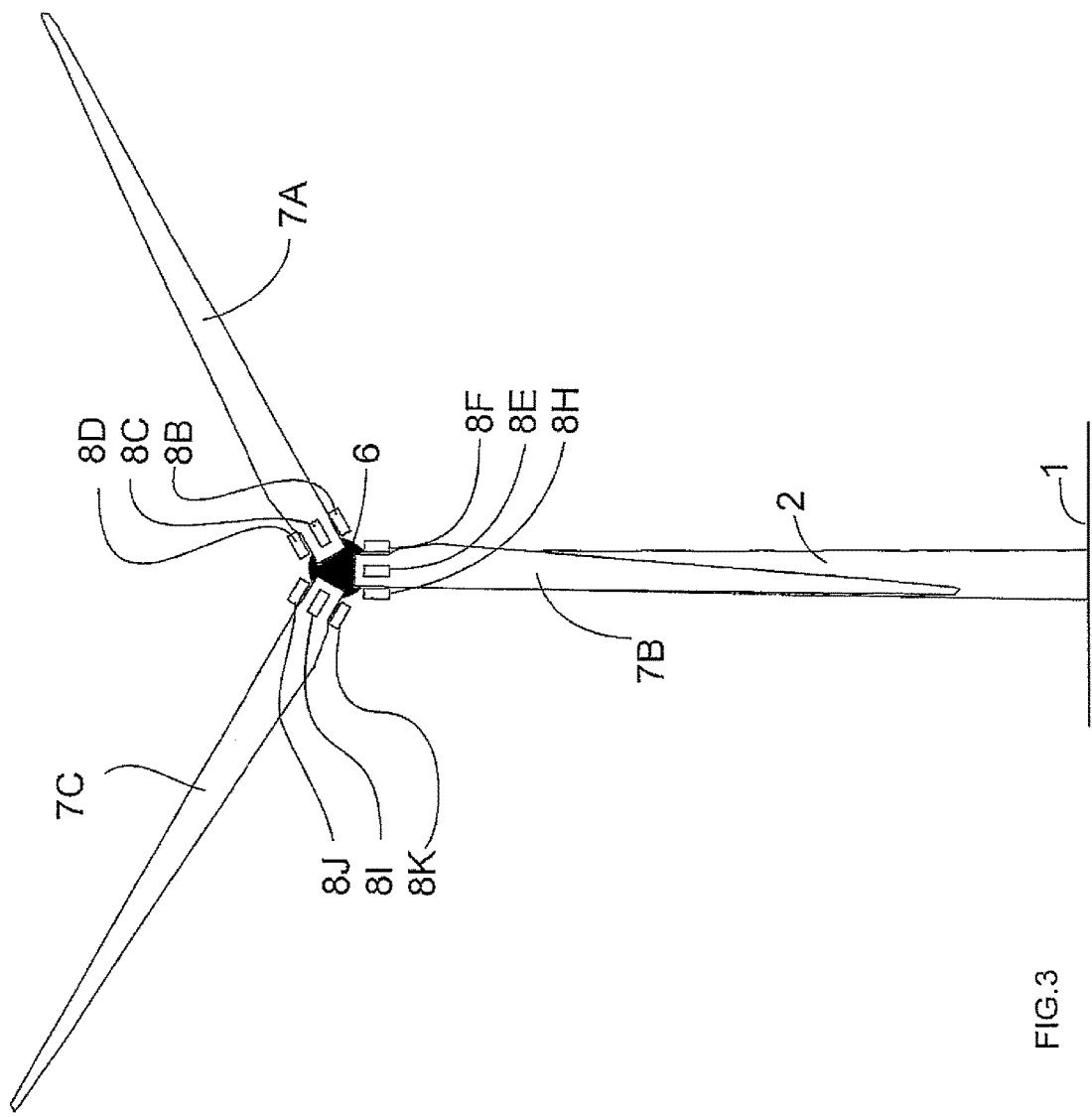
FIG. 3 is a front elevational view of the turbine of FIG. 1 showing optional placements of the cameras of the method of the present invention.

FIG. 3 is a front elevational view of the turbine of FIG. 1 showing the placement of the cameras of the method of the present invention, as follows:

Camera 8B is located at the leading edge position of the first blade 7A;

Camera 8C is located at the up-wind position of the first blade 7A;

Camera 8D is located at the trailing edge position of the first blade 7B;

Camera 8E is located at the up-wind position of the second blade 7B;

Camera 8F is located at the trailing edge position of the second blade 7B;

Camera 8H is located at the leading edge position of the second blade 7B;

Camera 8I is located at the up wind position of the third blade 7C;

Camera 8J is located at the leading edge position of the third blade 7C;

Camera 8K is located at the trailing edge position of the third blade 7C.

Figure 4:
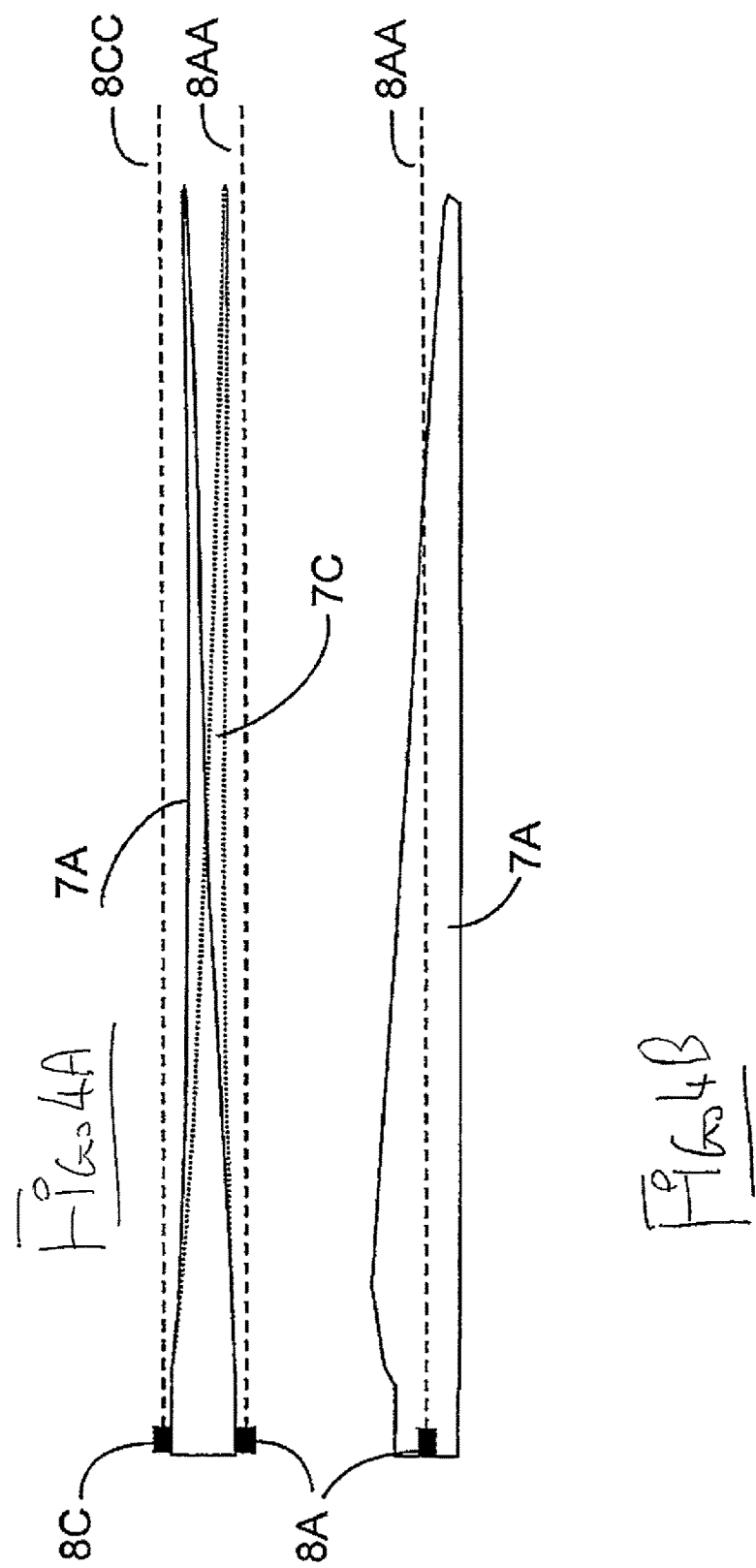
FIGS. 4A and 4B show side elevational views of a blade showing the cameras and the deflection of the blade.

FIGS. 4A and 4B show the cameras 8A and 8C which are located as described above at the down-wind position and up-wind positions respectively together with the optical axis of each camera. 7A represents the blade in load free state, 7C represents the blade under load and deflection.

Figure 6:
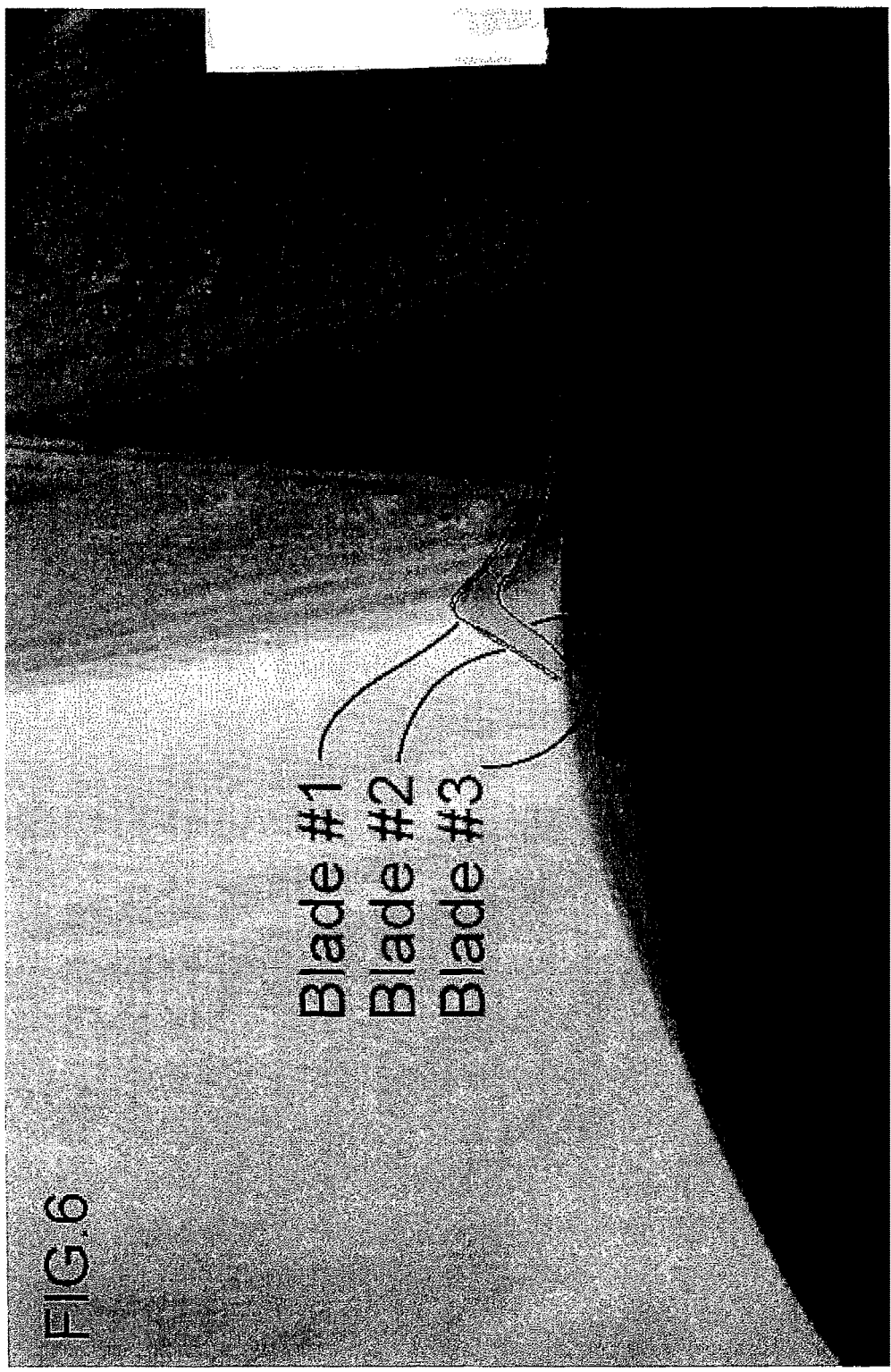
Figure 7:
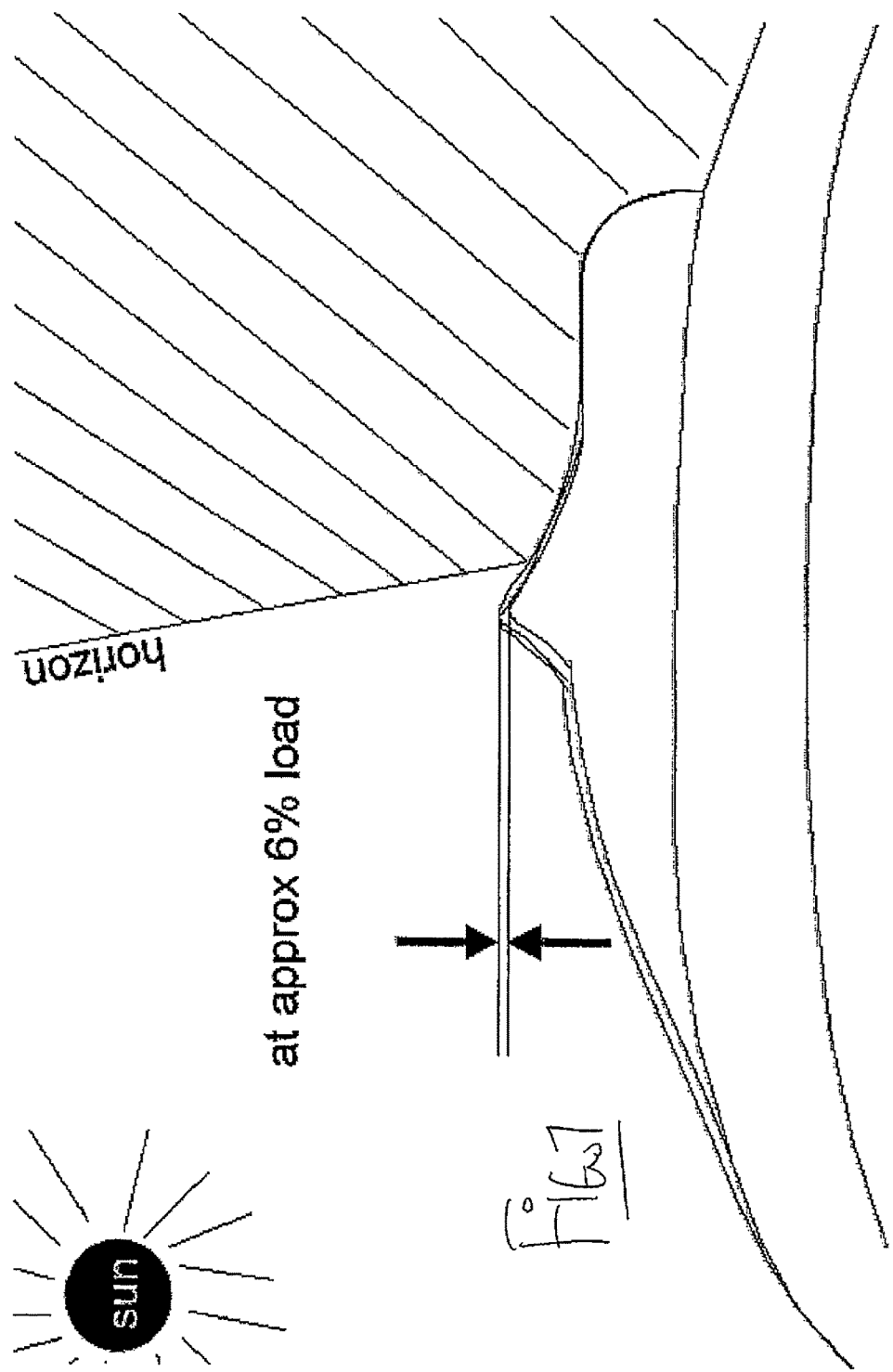
FIGS. 7 and 8 show an analysis of the frames of FIGS. 5 and 6 to determine from the images the edge of the blades.
Figure 9:
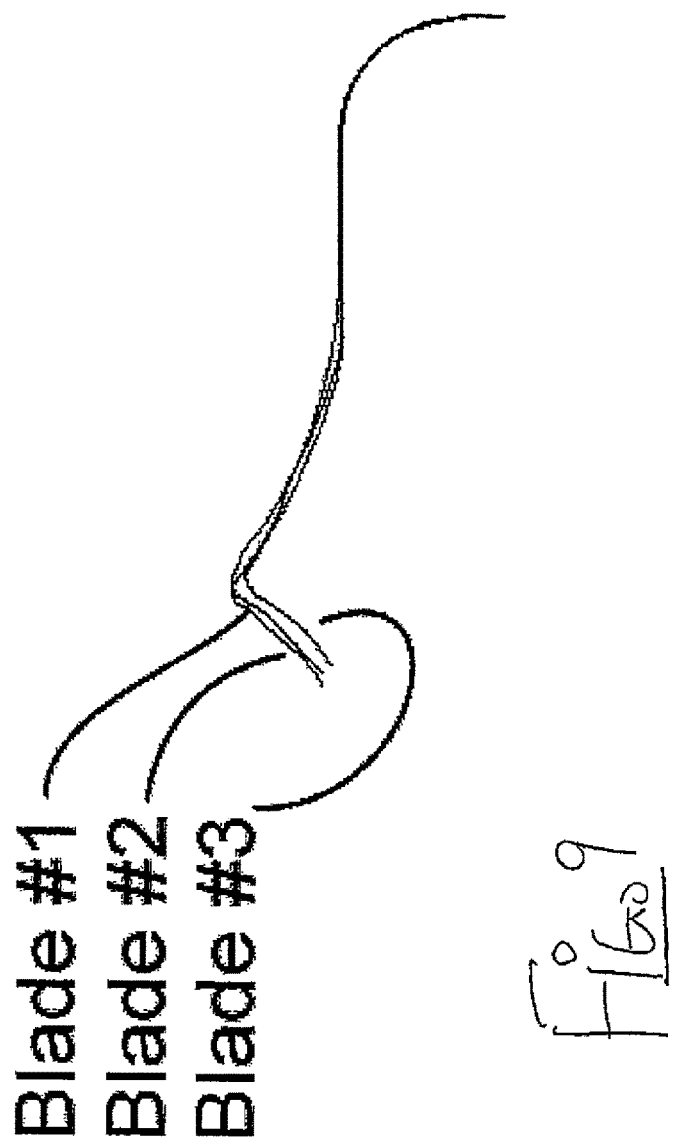
FIGS. 9 and 10 show an analysis of the frames of FIGS. 5 and 6 to show only the edges of the blades.

FIGS. 6, 7 and 9 show the turbine running at approximately 800 min-1 generator speed where the rotor speed is approximately 19.7 min-1, where all of the three blades #1, #2 and #3 all match closely. FIG. 6 shows the actual images taken from the video camera at the horizon on the downwind side where the three images have been selected and superimposed to show the three separate edges of the blades on the same image.

FIG. 7 shows the traced outline of the blade and the horizon as taken from the image of FIG. 6.

FIG. 9 shows the traced outline of the portion only of the blade which indicates the amount of the deflection.

Figure 5:
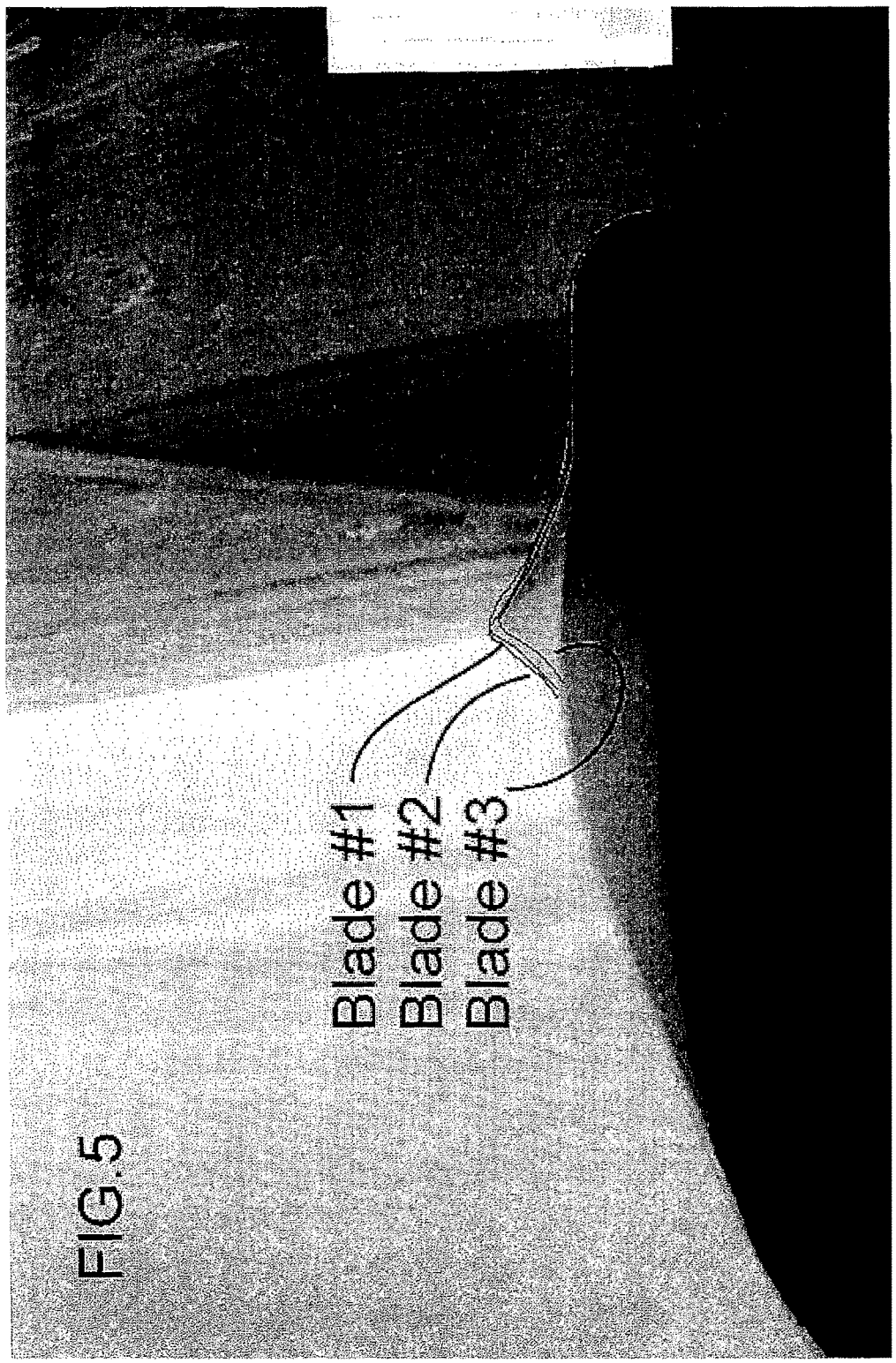
FIGS. 5 and 6 show actual examples of two of the frames of the video image taken by the camera showing the edge of the blades for analysis of the deflection, the frames being selected at the horizontal at the downstream side of the tower and at different loading conditions.
Figure 8:
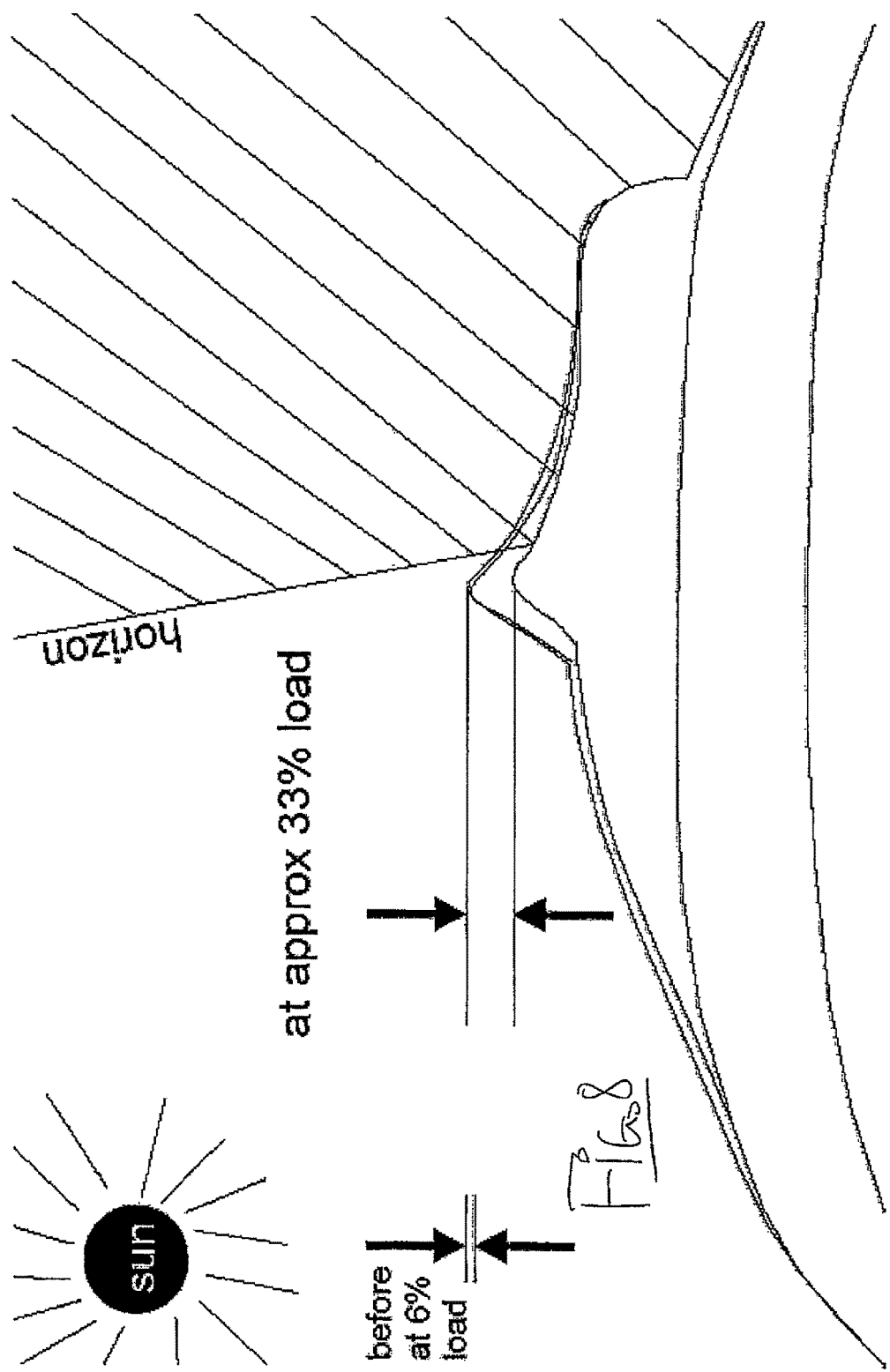
Figure 10:
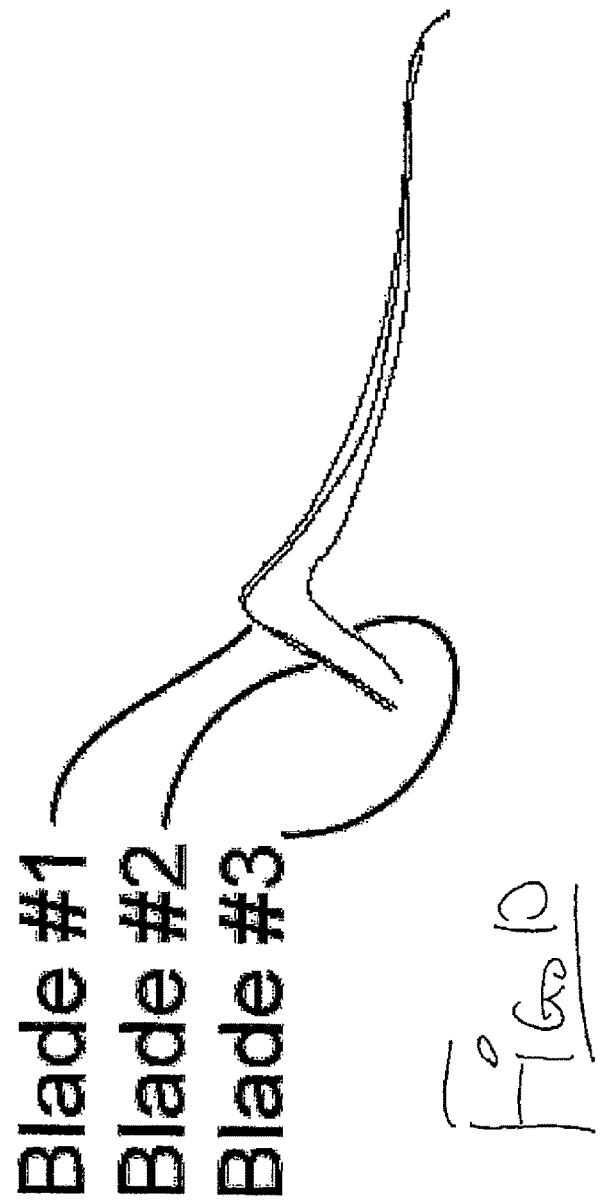

FIGS. 5, 8 and 10 show the turbine running at approximately 1000 min-1 generator speed where the rotor speed is approximately 24.6 min-1 where blade #3 (manufactured by a first manufacturer) appears to be stiffer not deflecting as much as the blades (manufactured by a second manufacturer). This analysis was carried out at a power rating of 350 kW relative to the maximum of 750 kW at full capacity. At 750 kW the differences will be even more distinguishable.

Thus the method of the present invention includes positioning a video camera 8 on the rotor at a root of a respective one of the blades so as to provide a line of sight of the camera along the respective one of the blades to the tip to obtain a video image of the rotor and tip. Still images taken from the video stream are shown in FIGS. 5 and 6. An analysis of the images of the tip as shown in FIGS. 7, 9, 8 and 10 to determine a position of the tip and hence the deflection of the tip.

The analysis is carried out by obtaining on the video camera during rotation the rotor a plurality of frames of the video image, selecting for analysis from the plurality of frames of the video image at least one frame for analysis and carrying out an analysis of the frame to determine a position of the tip of the blade in the frame.

As shown in FIGS. 5 and 6, the frame selected is located at a predetermined angular position of the blade of the rotor which in this example is at the horizon on the downwind side or on the side angularly beyond the tower since this location can be readily determined in the images during analysis.

The method requires a camera on each blade and the method includes selecting and comparing the position of the tips in the frames at the same angular location and at the same power and wind conditions.

While only one analysis is shown in the above Figures it will be appreciated that the video image is taken during a period sufficient to contain different loading conditions on the blades. Thus the analysis can be repeated.

The method also includes, as shown in FIGS. 5 and 6, the step of selecting at least two frames at different loading conditions for comparison of the deflection of the blades at different loads.

The cameras 8D, 8F and 8K for example are provided on the same location on each of the three blades so that the position of the tips in the frames at the same loading conditions can be taken by those cameras and compared at the same angular orientation.

As shown in FIGS. 5 and 6, the image or frame is analyzed by detecting and defining in the frame the peripheral edge of the remote end of the blade as visible in the image. This edge can be traced manually by observing one image of one blade and looking on the image for the edge which is then traced directly in the image. The three images of the three separate blades can then be superimposed to properly locate the three edges relative to one another on the same image.

In some cases the comparison test described above the deflection differences were enough to confirm substantial mechanical deviations between blade manufactures or could confirm severe structural damage (delamination) after lightning strike. In the latter case it confirmed the need for further investigation or blade exchange.

Using the data collection system 20, the images are analyzed at different load, capacity, power produced or environmental data such as wind speed and similar. That is the recorded camera video streams are time synchronized analyzed optionally with external data providing load, capacity, power produced or environmental data such as wind speed and similar.

The position of the desired blade part (for instance tip position) can either be determined or measured in the videos or in isolated still frames. In the example below the horizon was chosen as reference point providing enough certainty that the blades experience the same wind.

As shown in FIGS. 6, 7 and 9 at around 6% load (close to load free and freewheeling) all three blades match very close in position. Already at 33% two blades significantly deflect more than the third blade.

In order to obtain actual values of deflections as opposed to the comparison test described above in some tests it is possible by knowing the geometric dimensions of the blade at or adjacent the deflection, the amount of the deflection in actual length (meter) can be calculated and verified against design values. That is typically the tip of the blade is formed of a separate material to that a line of separation of the tip relative to the remainder of the blade can be determined. As the width of the blade at this location is known from the design drawings, this value of width can be used in the image to compare to the amount of deflection measured in the image to obtain an actual numerical value for the amount of deflection. If the tip separation line is not available or is not suitable, other positions along the length of the blade can be used by analysis of the design construction of the blade and by creation of imaginary lines at spaced positions along the blade from those design constructions.

The rotor of any given wind turbine is tilted upwards by around 5 degree (+/−2 degree or more). If the rotor disc can be considered to be equal to a clock than there are 4 significant load positions. In a presumed uniform wind field (wind speed at all heights identical), at 12:00 the blade experiences the nominal wind speed detected by the turbines Anemometer, if the blade tips moves down than it is moving against the incoming wind speed and experiences at 3:00 the highest load (typical position blade crossing the horizon). This represents a significantly higher wind speed than at 12:00 and in general would also represent the highest wind speed/load during one rotation.

When the blade moves further down it will pass the tower at 6:00. Shortly before and after this position the air flow is disturbed due to the tower blocking the wind (tower dam effect). The aerodynamic forces essentially collapse briefly at this position. This leaves this position to be the one of least or none value for comparison purposes due to for a short period of time at an undefined load scenario.

After this the blade passes the 9:00 position where it experiences the lowest effective wind speed because the blade is moving back following or moving with the wind (typical position crossing the horizon).

Therefore the blade experiences significant different wind speeds during one rotation where the effective wind speed directly correlates with the load. (is there a drawing required?) It is important to observe all areas of rotation since structural damage and deviation in blade deflection does not necessarily occur at the highest load point but at any load point in between.

During the operation of wind turbines blades can get hit by lightning or objects (birds or debris in major storms). Even so the impact of objects or the lightning strike may not show obvious damage, de-lamination, cracking or other structural damage might have been occurred. In this case the procedure described in this application can help to determine if the blade in question either does deviate or does not in comparison to the other unaffected blades of the turbine regarding the dynamic behavior or blade deflection under different states of load. Any more severe instrumentation like strain gauges would for simple economic reasons not make any sense since it would cost multiple times what a necessary repair or even blade exchange would cost.

Figure 11:
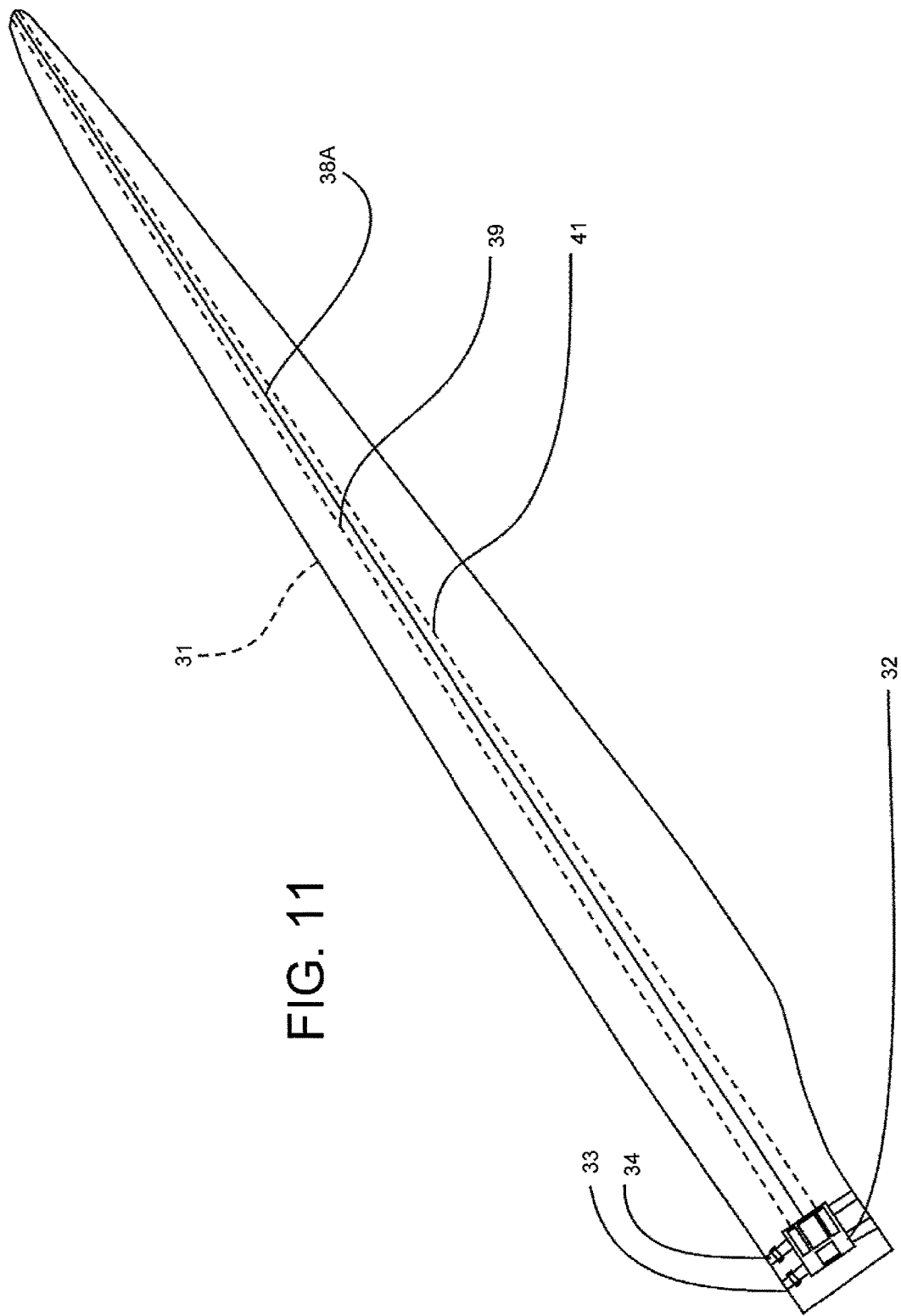
FIG. 11 is an elevational view of one blade showing mounting of the camera system on the root of the blade.
Figure 12:
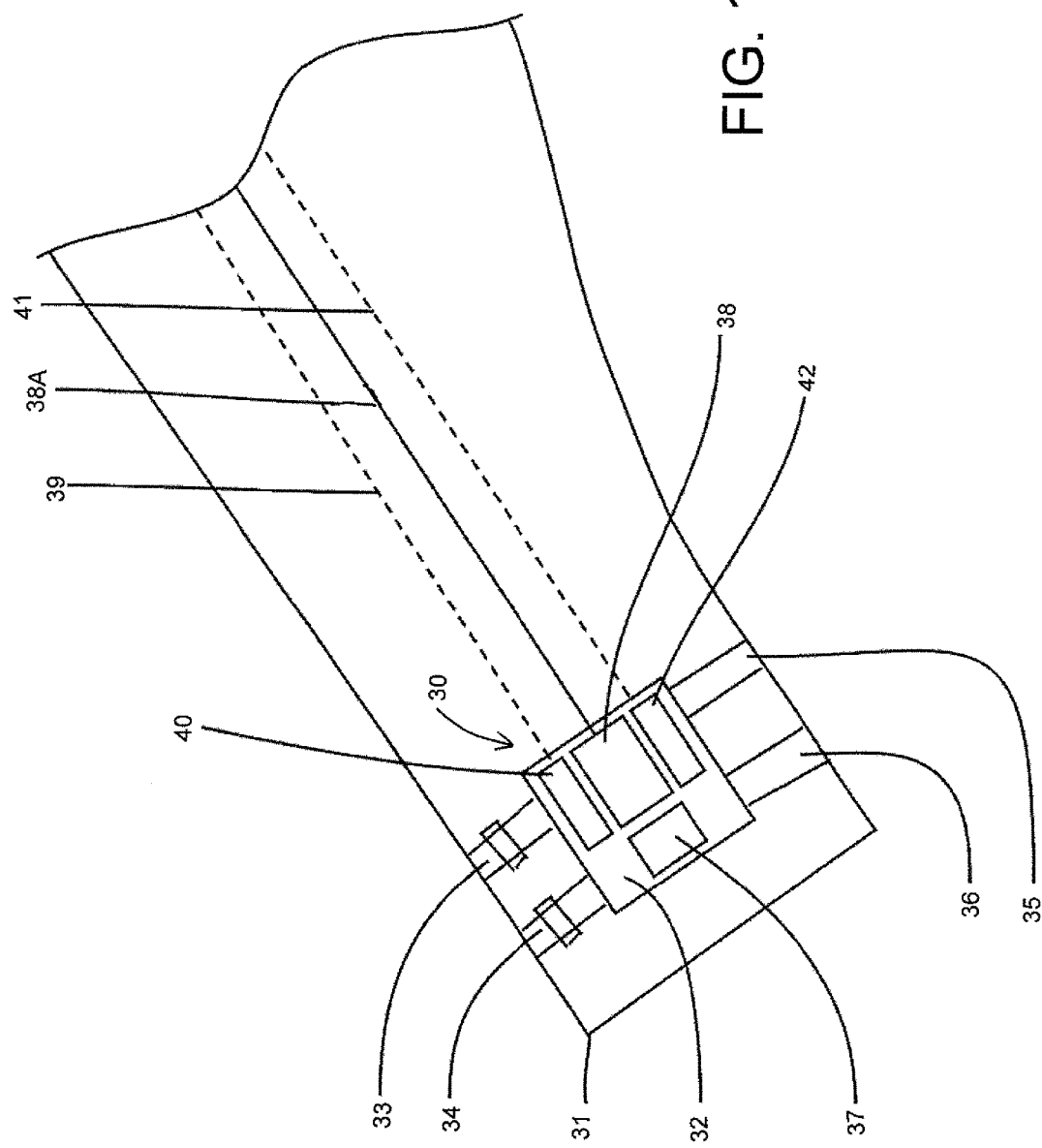
FIG. 12 is an enlarged view of the cameras system and root of the blade of FIG. 11.

Turning now to FIGS. 11 and 12, the blade observation unit 30 is mounted to the blade 31. The position around the blade at or relative the high pressure side (blade surface pointing into the wind), leading edge (blade edge in rotational direction), low pressure side (blade surface pointing away from the wind) and trailing edge (blade edge opposite to the rotational direction) will be determined to have the most beneficial few of the blade deflection.

The Blade observation unit 30 consists of the following components:

Three individual and simultaneously operating mounting Platforms 32' are secured each with two Ratchet straps to the blades root. On the right to the Mounting Platform 32 is the part of the ratchet straps with the Ratchet 33, 34 and on the left the straps come around and through the platform as indicated at 35, 36. The individual main components mounted to the platform include a container/housing 37 with battery power supply and video storage. A container/housing 38 with the camera recording video streams during operation looking along a camera view line 38A. The time stamp of the camera is synchronized to the turbines SCADA system (Supervisory control and data acquisition). The beams 39 and 41 of a right and left line Lasers 40 and 42 is provided for marking a scaling reference. After the Blade observation units are installed and activated the turbine can be operated in normal condition. After any time frame deemed suitable, the system is unmounted and the video streams recorded by the individual cameras is obtained. Clearly identifiable measurement points during the rotation are chosen. This can be typically the positions when the blade crosses the horizon. It is either possible to have instant scaling measures as an overlay to the video stream or individual frames at the specific position are extracted and compared. Those will have to be aligned to the time stamp in the SCADA system and relating Power/Load/Production/Wind speed can be correlated.

The deflection measurement is done by the use of the Scaling Lasers 40, 42. Those Line Lasers create two laser marks 39, 41 along the blade which are parallel and have a predefined distance. By tilting the marks 90 degree in the area of the deflection it can be referred to the known distance between the two lines with the deflection of the blade. The deflection of the blades or comparison thereof can be measured in an accuracy of at least 0.5 cm.

If the deviation between the three blades exceeds expectations or thresholds the blade in question can be replaced. In some cases a real measurement and reference to SCADA or any scaling might not even be necessary if the video streams/frames revile obvious excessive deviations.

If the deviations are not excessive, or within expected values the turbine can return to safe operation.

With the procedure and equal and simultaneously camera positioning and recording, the blade deflection can be compare for each blade at any given position. However not all blade rotor positions are suitable since they will be under useful and not useful load conditions.

There are three basic cases this will be used for. In case 1, verification of dynamic behavior being similar in acceptable range or not, if one or more blades are from different blade molds or even different manufacturers. Blades from different manufacturers or molds to be put in one blade set (set of 3) are often occurring when selecting of spare blades is necessary. Several standards in the industry suggesting that this should not be done (mixing blades) since the blades will perform differently and create unwanted forces to the drive train of the turbine. If the deviations are above acceptable limits the blade in question would have to be replaced. However as mentioned I had to document frequently in my work that those blade mixes do occur.

In case 2, selecting turbines to be tested with more specific and permanent load measurements e.g. strain gauges. This is often the case for design verification of wind turbine blades of new or pre-series type turbines. A certain variation in the early production process is expected but it is unclear which turbine blades in the field will show the critical deviations. For this purpose normally 10 to 300 of those turbines are typically to be installed. The full instrumentation with strain gauges and periphery equipment does take long and is expensive $100 k to $250 k and more per turbine. Therefore the instrumentation of all turbines is economically not feasible. The turbine would have to be and commonly is selected randomly not knowing if it is a good or bad example or a representative for the population of wind turbines. This test does allow to quickly and cheaply review (test) and compare a number of turbines (even multiple at the time) for a fraction of the time and cost (1-2%) to identify the group of blades and turbines which show very similar dynamic behavior vs a potential small number of turbines which obviously would represent outliers to be focused on or discarded for further testing.

In case 3, during the operation of wind turbines blades can get hit by lightning or objects (birds or debris in major storms). Even so the impact of objects or the lightning strike may not show obvious damage, de-lamination, cracking or other structural damage might have been occurred. In this case the test as described under Case (2) in this application can help to determine if the blade in question either does deviate or does not in comparison to the other unaffected blades of the turbine regarding the dynamic behavior or blade deflection under different states of load. Any more severe instrumentation like strain gauges would for simple economic reasons not make any sense since it would cost multiple times what a necessary repair or even blade exchange would cost.

The rotor of any given Wind turbine is tilted upwards by around 5 degree (+/−2 degree or more). If the rotor disc can be considered to be equal to a clock than there are 4 significant load positions. In a presumed uniform wind field (wind speed at all heights identical), at 12:00 the blade experiences the nominal wind speed detected by the turbines Anemometer, if the blade tips moves than it is moving against the incoming windspeed and experiences at 3:00. This represents a significantly higher wind speed than at 12:00 and in general would also represent the highest windspeed/load during one rotation.

When the blade moves further down it will pass the tower at 6:00. Shortly before and after this position the air flow is disturbed due to the tower blocking the wind (tower dam effect). This leaves this position to be the one of least valueable for comparison purposes due to for a short period of time at an undefined load scenario.

After this the blade passes the 9:00 position where it experiences the lowest effective wind speed because the blade is moving back following or moving with the wind. Therefore the blade experiences significant different wind speeds during one rotation where the effective wind speed directly correlates with the load. It is important to observe all areas of rotation since structural damage and deviation in blade deflection does not necessarily occur at the highest load point but at any load point in between. Load=aerodynamic forces (load) created by the incoming wind respectively creating lift forces (bending under load) and a torque moment relative to the main shaft).

Any type of permanent marks along a blade, like literally marks painted for that purpose to a part of the blade which is visible to the camera, or temporary marks like two or more parallel lasers which are parallel to the optical axis of the camera and aligned in the direction of the tip. Current prototype will have those two lasers.

The camera can be mounted in any position. For the tests done, some blades are rather stiff and are not pre-bend. So the deflection is clearly best to detect at the down wind side. However some blades are pre-bend (called pre-tension) against the wind and might straighten out under full load so that they would appear straight, in which case it would be better to have them on the up wind side. Other blades are pre-bend but will bend beyond the "straightened out phase, in which case a decision has to be made which position is more beneficial up-wind or down-wind or if both sides have to be tested.

For the purpose of a suspected Lightning strike and if it is possible or suspected that damage has occurred or is suspected to the structure in leading or trailing edge causing "edge-wise" bending, then the cameras have to be mounted viewing the leading edge or trailing edge. The high pressure side is the up-wind side vs the low pressure side is the down-wind side of the blade.

Reference using the horizon, as mentioned before since this is the expected highest load point. However the three videos can be time or position (relative to the horizon) synchronised viewed overlapped or side by side to catch obvious deviations, . . . which than can be further investigated and at the point of highest deviation be measured (distance deviation)

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A method for replacing a blade of a wind turbine, where the wind turbine comprises a tower, a nacelle mounted to the top of the tower, a rotor rotatably connected to the nacelle for rotating about a rotor axis, the rotor including a plurality of equally spaced blades which rotate angularly around the rotor axis with each blade having a root at an inner end of the blade and a tip at an outer end of the blade, the method comprising:

carrying out an assessment of a structural integrity of the blades for blade exchange by detecting an amount of deflection of the blades comprising:

positioning a plurality of video cameras on the rotor with each of the plurality of video cameras being located at the root of a respective one of the blades so as to provide a line of sight of the respective video camera along an exterior surface of the respective one of the blades to the tip of the respective one of the blades;

simultaneously operating by the video cameras to obtain a plurality of video images, where each video image is taken of a respective one of the blades and the tip of the respective blade as the respective blade rotates around the rotor axis;

carrying out an analysis of the plurality of video images of the tip of each of the blades to determine a position of the tip of each of the blades and hence the amount of deflection of each of the blades;

in the analysis obtaining, at least at one angular position around the rotor axis of the blades which angular position is common for each of the blades and different from an angular position aligned with the tower, a comparison of an amount of deflection of the each of the blades relative to others of the blades;

and carrying out a determination that an amount of deflection of one of the blades at said at least one angular position is different from an amount of deflection of others of the blades at said at least one angular position, and at least in part as a result of said determination effecting a blade exchange.

2. The method according to claim 1 wherein said at least one angular position of the blades is located at a horizon.

3. The method according to claim 2 wherein said one angular position of the blades is located at the horizon on a side of the tower angularly beyond the tower.

4. The method according to claim 1 wherein the video image is taken during a period sufficient to contain different loading conditions on the blades.

5. The method according to claim 1 wherein at least two images are selected at different loading conditions for comparison of deflection at different loads.

6. The method according to claim 1 wherein known geometric dimensions of the blade at positions along the blade are used for calculating the deflection in actual length.

7. The method according to claim 6 wherein a known width dimension at a predetermined position along the blade is used to calculate an actual value of the deflection.

8. The method according to claim 1 wherein each respective video camera is mounted on the high pressure side or downwind side of the respective blade looking along the respective blade at a leading edge of the respective blade.

9. The method according to claim 1 wherein each respective video camera has an optical axis lined up along a longitudinal axis of the blade.

\* \* \* \* \*